United States Patent
Oh (10) Patent No.: US 12,496,478 B2
(45) Date of Patent: Dec. 16, 2025

(54) SIDE BRACKET FOR INSTALLATION OF SPRINKLER

(71) Applicant: KOFULSO CO., LTD., Incheon-si (KR)

(72) Inventor: Seung-il Oh, Seoul (KR)

(73) Assignee: Kofulso Co., Ltd, Incheon-si (KR)

( * ) Notice: Subject to any disclaimer, the term of this patent is extended or adjusted under 35 U.S.C. 154(b) by 393 days.

(21) Appl. No.: 18/179,603

(22) Filed: Mar. 7, 2023

(65) Prior Publication Data
US 2024/0299788 A1 Sep. 12, 2024

(30) Foreign Application Priority Data
Jan. 10, 2023 (KR) .................. 10-2023-0003369

(51) Int. Cl.
*F16M 13/00* (2006.01)
*A62C 31/28* (2006.01)

(52) U.S. Cl.
CPC .................................. *A62C 31/28* (2013.01)

(58) Field of Classification Search
None
See application file for complete search history.

(56) References Cited

U.S. PATENT DOCUMENTS

| | | |
|---|---|---|
| 4,135,692 A | 1/1979 | Ferguson |
| 4,408,428 A | 10/1983 | Brooke et al. |
| 4,717,099 A | 1/1988 | Hubbard |
| 5,595,363 A | 1/1997 | De Leebeeck |
| 5,667,181 A | 9/1997 | Van Leeuwen et al. |
| 6,260,810 B1 | 7/2001 | Choi |
| 6,345,800 B1 | 2/2002 | Herst et al. |
| 6,811,130 B1 | 11/2004 | Oh |
| 7,255,315 B2 | 8/2007 | Oh |
| 8,413,734 B2 | 4/2013 | Silcox et al. |
| 8,833,718 B2 | 9/2014 | Oh |
| 8,889,984 B2 | 11/2014 | Korez et al. |
| 9,004,421 B2 | 4/2015 | Feenstra |
| 9,091,051 B2 | 7/2015 | Baxter et al. |
| 9,526,934 B2 | 12/2016 | Jung |
| 9,534,622 B2 | 1/2017 | Jung |
| 9,718,076 B2 | 8/2017 | Oh |
| 10,173,088 B2 | 1/2019 | Chong |
| 10,371,290 B2 | 8/2019 | Dafonseca et al. |
| 10,561,873 B2 | 2/2020 | Beagen et al. |
| 11,320,066 B2 | 5/2022 | Dafonseca et al. |
| 2008/0083853 A1* | 4/2008 | Oh ............................ F16L 3/24 248/74.1 |
| 2011/0154755 A1* | 6/2011 | Oh .......................... A62C 35/68 52/220.8 |

(Continued)

*Primary Examiner* — Steven M Marsh
(74) *Attorney, Agent, or Firm* — Dunlap, Bennett, & Ludwig (57) ABSTRACT

Side brackets for installing a sprinkler, installed on both ends of a support bar; standing parts formed at a distance of a width of the support bar; a first elongated hole in each of the standing parts; a top surface part having a first protruding part and a screw hole and pressing member; a first wing part with a second elongated hole; a second protruding part and a support part formed at an upper portion thereof; a second wing part at a lower portion of the second protruding part; and a coupling hole formed in the second wing part.

2 Claims, 7 Drawing Sheets

(56) References Cited

U.S. PATENT DOCUMENTS

| | | | | |
|---|---|---|---|---|
| 2011/0155865 | A1* | 6/2011 | Oh | A62C 35/68 248/67.7 |
| 2013/0105640 | A1* | 5/2013 | Feenstra | E04B 9/18 248/75 |
| 2013/0105641 | A1* | 5/2013 | Feenstra | E04B 9/18 248/75 |
| 2013/0291460 | A1* | 11/2013 | Oh | A62C 35/68 52/220.6 |
| 2022/0339479 | A1* | 10/2022 | Oh | A62C 35/68 |
| 2022/0355145 | A1* | 11/2022 | Oh | A62C 31/28 |
| 2024/0159052 | A1* | 5/2024 | Doucette | E04B 9/205 |

* cited by examiner

SIDE BRACKET FOR INSTALLATION OF SPRINKLER

TECHNICAL FIELD

The present invention relates to side brackets for installing a sprinkler, which are installed on both sides of a support bar for an installing bracket on which a fire sprinkler is installed.

The present invention relates to a side bracket for installing a sprinkler, capable of installing a plurality of members such as M-bars, T-bars, L-bars, squared materials and plates having various cross sections suitable for the purpose of use without limitation, in addition to the support bar for an installing bracket.

BACKGROUND ART

In general, members of various cross sections are installed crossing each other in order to install firefighting, electrical, and various equipment on the ceiling. The cross section of this member has a shape suitable for an object to be installed.

Conventionally, since the cross sectional shapes of the members are diverse, there is a problem in that brackets used for cross-installing the members should also be provided for each purpose.

Figure 1:
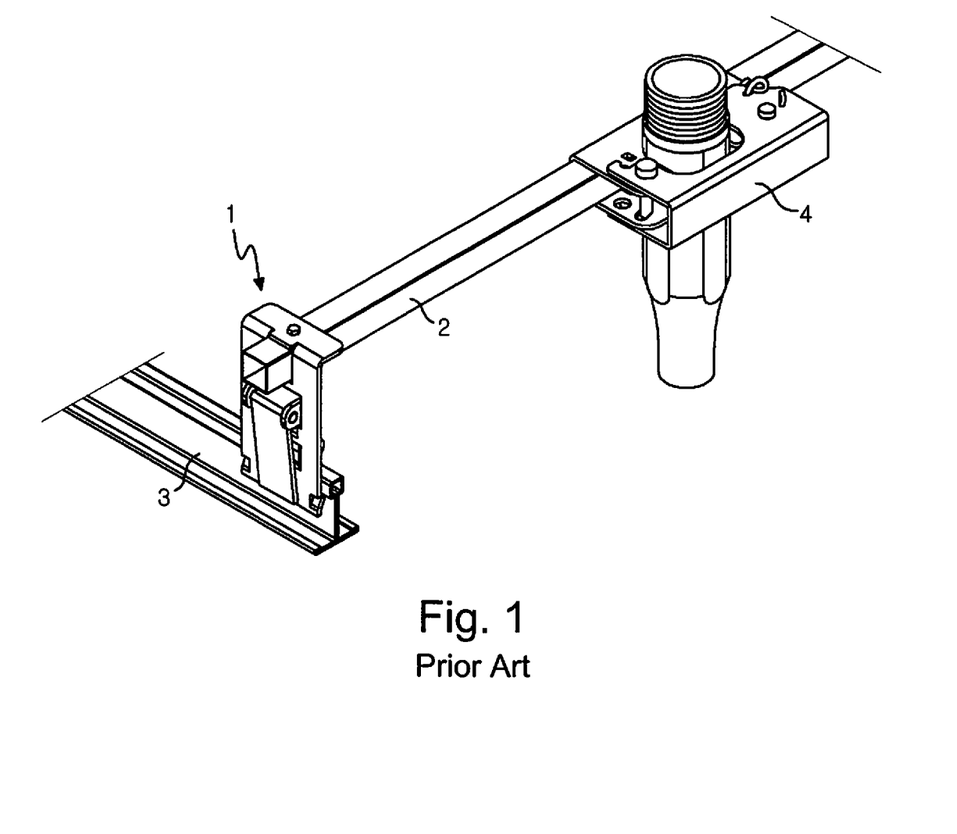
FIG. 1 is a perspective view showing a prior art bracket assembly for installing a sprinkler.

FIG. 1 is a view showing a conventional prior art bracket assembly for installing a sprinkler, which is used to install a sprinkler on a ceiling among types of brackets.

The conventional bracket assembly for installing a sprinkler includes an installing bracket 4 where a sprinkler is installed, a support bar 2 on which the installing bracket 4 is installed, and side brackets 1 fixedly installed on both sides of the support bar 2 so as to install cross members 3 such that the cross members 3 are positioned across the support bar 2, as shown in FIG. 1.

The conventional side bracket 1 for installing a sprinkler also has a configuration in which only one type of cross member 3 having a specific cross section is coupled to a support bar 2 like a bracket installed on a ceiling.

The side bracket 1 of U.S. patent application Ser. No. 17/389,546 of the present inventor, as shown in FIG. 1, also has the same structure as the conventional ceiling equipment installation bracket in that only a T-bar, which is a kind of the cross member 3 and the support bar 2, can be installed.

Accordingly, the present invention has been derived as a result of efforts to solve conventional technical problem of having to have a bracket for each purpose according to the location, by allowing various types of cross members 3 to be freely installed together with support bars 2 on the side bracket for installing a sprinkler 1.

SUMMARY OF THE INVENTION

Technical Problem

Accordingly, the present invention has been derived to solve the above-mentioned problems occurring in the related art, and it is an object of the present invention to provide to a side bracket for installing a sprinkler, so that various types of cross members can be installed without limitation.

Problem Solving Means

In side brackets for installing a sprinkler, which are installed on both sides of a support bar, the object of the present invention is achieved by providing a side bracket for coupling a sprinkler, including standing parts formed at a distance corresponding to a width of a support bar, a first elongated hole formed in each of the standing parts, a top surface part for connecting upper portions of the standing parts and having a first protruding part formed in a forward direction, a screw hole formed in the first protruding part, a pressing member coupled to the screw hole, a first wing part formed to be bent outwards at a rear portion of each of the standing parts, a second elongated hole formed in the first wing part, a second protruding part formed at a lower portion of each of the standing parts, a support part formed to be bent inwards at an upper portion of the second protruding part, a second wing part formed to be bent outwards at a lower portion of the second protruding part, and a coupling hole formed in the second wing part.

Effect of the Invention

The present invention as described above provides a side bracket for coupling a sprinkler, capable of installing a plurality of members such as M-bars, T-bars, L-bars, squared materials and plates having various cross sections suitable for the purpose of use without limitation, in addition to the support bar for an installing bracket, thereby increasing workability.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE INVENTION

Hereinafter, embodiments of the present invention will be described in detail with reference to the accompanying drawings.

The present invention relates to a side bracket constituting a bracket assembly for installing a sprinkler, which includes an installing bracket 4 where a sprinkler is installed, a support bar 2 on which the installing bracket 4 is installed, and side brackets 1 installed on both sides of the support bar 2.

Figure 2:
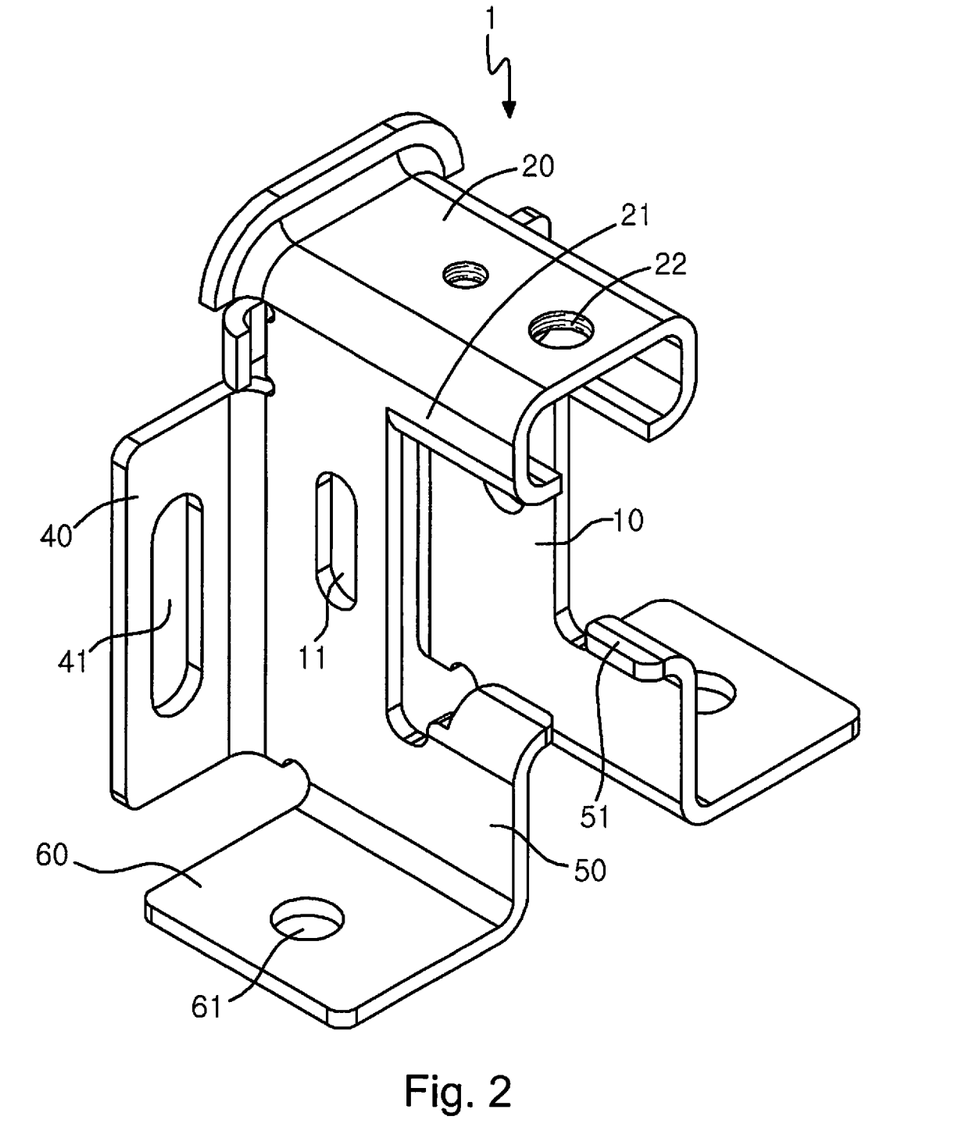
FIG. 2 is a perspective view showing a side bracket according to the present invention.
Figure 3:
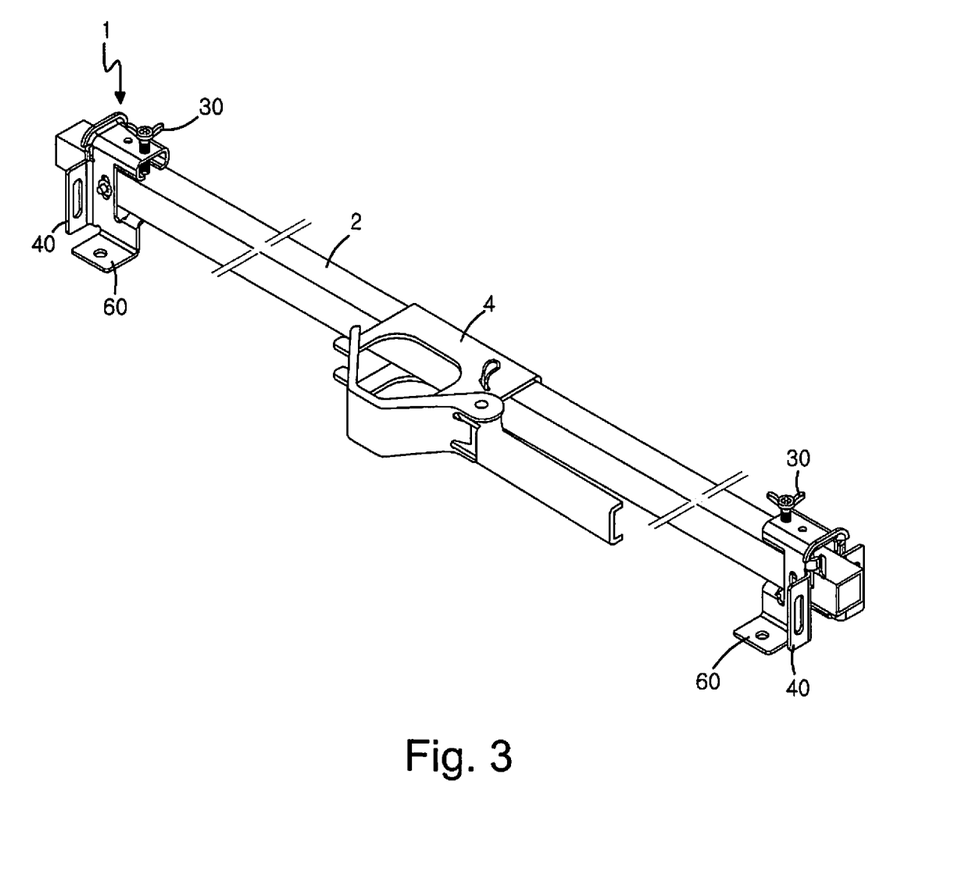
FIG. 3 is a view showing a state in which a support bar is installed on the side bracket of the present invention.

In side brackets for installing a sprinkler, which are installed on both sides of the support bar 2, a side bracket for coupling a sprinkler according to the present invention includes standing parts 10 formed at a distance from each other corresponding to a width of a support bar 1, a first elongated hole 11 formed in each of the standing parts 10, a top surface part 20 for connecting upper portions of the standing parts 10 and having a first protruding part 21 formed in a forward direction, a screw hole 22 formed in the first protruding part 21, a pressing member 30 coupled to the screw hole 22, a first wing part 40 formed to be bent outwards at a rear portion of each of the standing parts 10, a second elongated hole 41 formed in the first wing part 40, a second protruding part 50 formed at a lower portion of each of the standing parts 10, a support part 51 formed to be bent inwards at an upper portion of the second protruding part 50, a second wing part 60 formed to be bent outwards at a lower portion of the second protruding part 50, and a coupling hole 61 formed in the second wing part 60, as shown in FIG. 2 and FIG. 3.

The side brackets of the present invention are, as shown in FIG. 3, installed on both sides of the support bar 2 having a square cross section.

The support bar 2 is coupled to the side brackets by fasteners 70 through first elongated holes 11 in an area located between the standing parts 10.

When the pressing member 30 coupled to the screw hole 22 is tightened, the support bar 2 is supported and fixed by the support parts 51.

It is preferable that the screw hole 22 formed in the first protruding part 20 is positioned in a direction perpendicular to the support parts 51 so that the clamping force of the pressing member 30 can effectively act on the support parts 51.

As a cross member 3 coupled to the side bracket of the present invention together with the support bar 2, an M-bar, a T-bar, an L-bar, a squared board, and a plate may be employed, but the type of such a cross member 3 is not limited thereto.

The cross member 3 is for installing firefighting, electrical, and other various equipment on the ceiling, and the cross-section of the cross member 3 may be formed in various shapes depending on the type of equipment.

Figure 4:
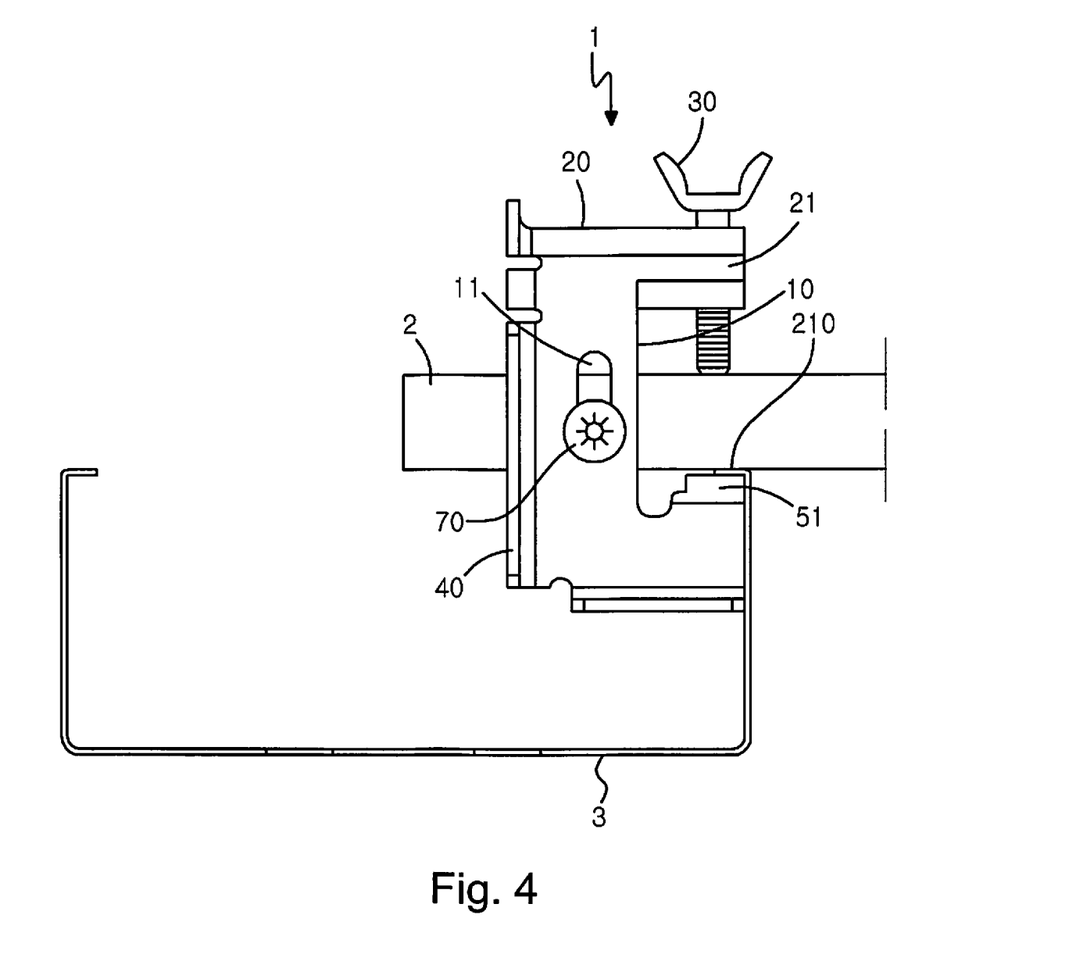
FIG. 4 is a view showing a state in which an M-bar as a cross member is installed on the side bracket according to a first embodiment of the present invention.

FIG. 4 is a view showing a state in which an M-bar is installed as the cross member 3 on the side bracket of the present invention together with the support bar 2.

As shown, in a state where the support bar 2 is coupled between the standing parts 10 by means of the fasteners 70, an inwardly bent part 210 of one side upper end of the M-bar is placed on the support part 51 of the second protruding part 50 and the pressing member 30 is tightened so that the bent part 210 of the M-bar is pressed by the support bar 2.

Figure 5:
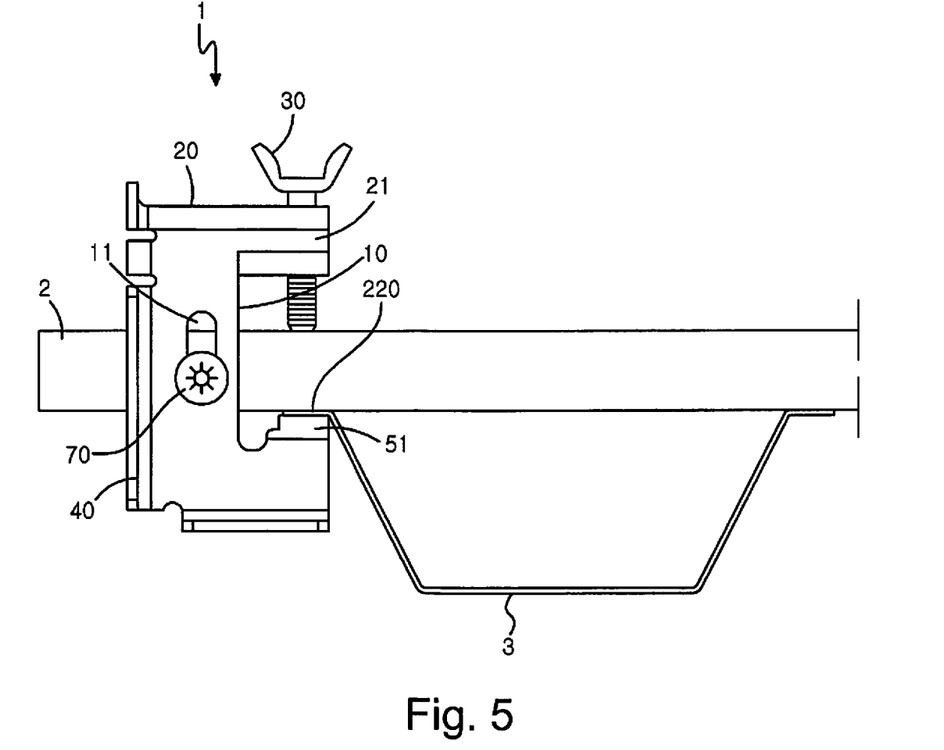
FIG. 5 is a view showing a state in which a cross member is installed on the side bracket according to a second embodiment of the present invention.

FIG. 5 is a view showing a state in which the support bar 2 and the cross member 3 is installed on the side bracket of the present invention, wherein the cross member 3 has an outwardly bent part 220 formed on the upper portion thereof.

As shown, in a state where the support bar 2 is coupled between the standing parts 10 by the fasteners 70, the outwardly bent part 220 is placed on the support parts 51 so as to be positioned on the support part 51 and the pressing member 30 is tightened so that the outwardly bent part 220 is pressed by the support bar 2.

Figure 6:
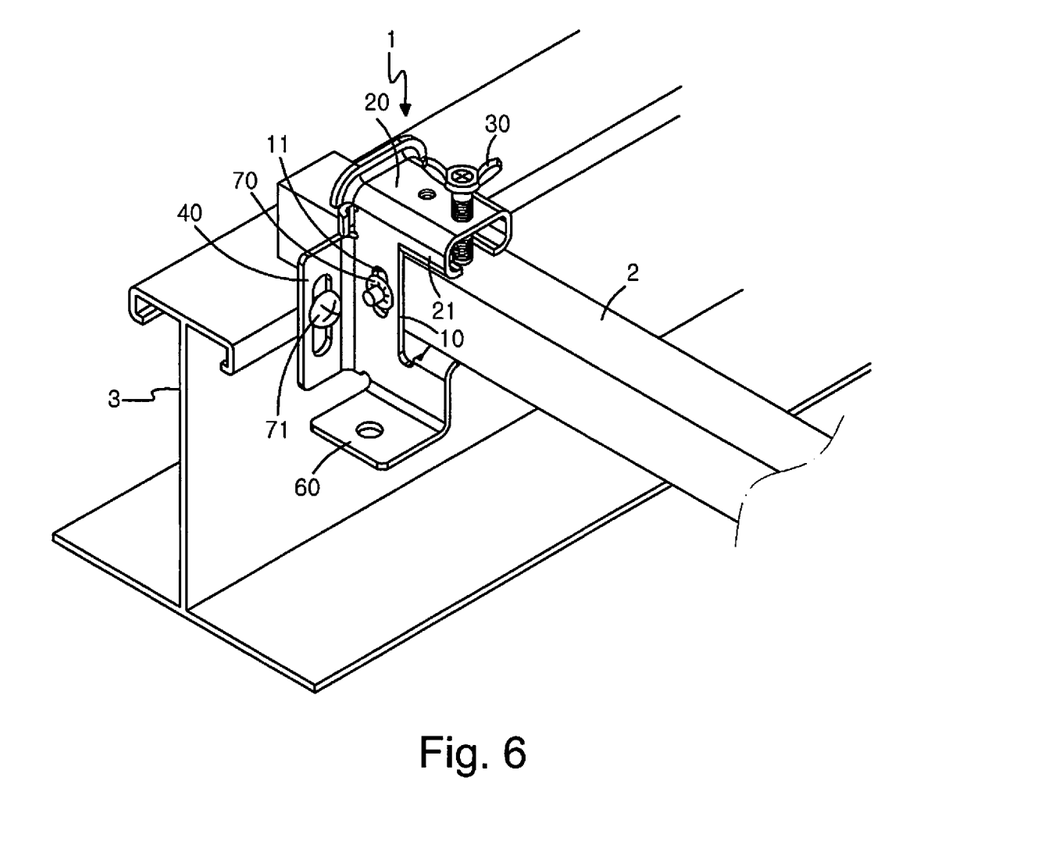
FIG. 6 is a view showing a state in which a T-bar as a cross member is installed on the side bracket according to a third embodiment of the present invention.

FIG. 6 is a view showing a state in which a T-bar is installed as the cross member 3 on the side bracket of the present invention together with the support bar 2.

As shown, in a state where the support bar 2 is placed on top of the T-bar, the outer surface of the upper end of the T-bar is closely attached and coupled to the first wing part 40 with fasteners 71.

Figure 7:
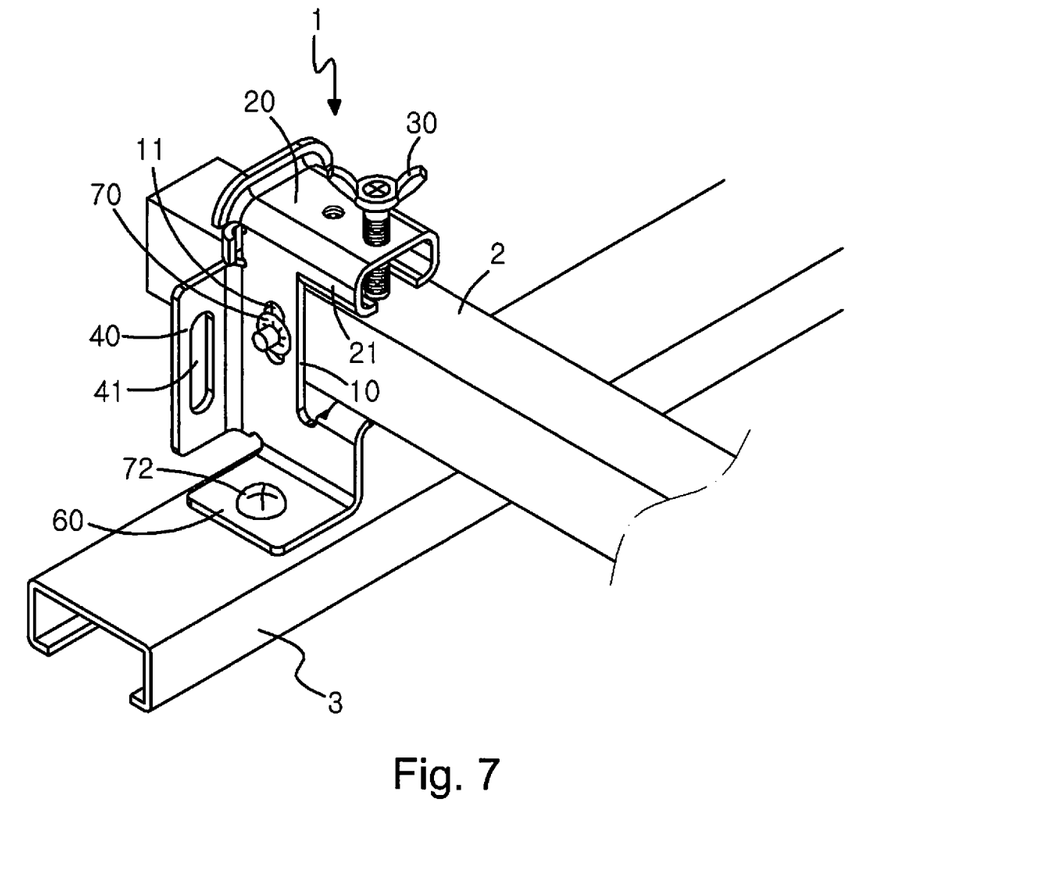
FIG. 7 is a view showing a state in which a cross member is installed on the side bracket according to a fourth embodiment of the present invention.

FIG. 7 is a view showing a state in which a plate as the cross member 3 is installed on the side bracket of the present invention together with the support bar 2.

As shown, in a state in which the support bar 2 is fixed to the support parts 51 by the pressing member 30, the plate as the cross member 3 is coupled through the coupling hole 61 with fasteners 72.

It is, of course, possible to install the support bar 2 and two or more crossing members 3 in the side bracket of the present invention, as necessary.

As mentioned hereinabove, the present invention provides the side bracket for coupling a sprinkler, capable of installing a plurality of members such as M-bars, T-bars, L-bars, squared materials and plates having various cross sections suitable for the purpose of use without limitation, in addition to the support bar 2 for an installing bracket.

While the present invention has been described in detail based on the accompanying drawings hereinabove, it is not limited thereto, and various changes are possible without departing from the technical spirit of the present invention.

What is claimed is:

1. A side bracket for installing a sprinkler, installed on both sides of a support bar, the side bracket for installing a sprinkler, comprising:
    standing parts formed at a distance corresponding to a width of a support bar;
    a first elongated hole formed in each of the standing parts;
    a top surface part for connecting upper portions of the standing parts and having a first protruding part formed in a direction of the support bar;
    a screw hole formed in the top surface part;
    a pressing member coacting with the screw hole;
    a first wing part formed to be bent outwards at a rear portion of each of the standing parts;
    a second elongated hole formed in the first wing part;
    a second protruding part formed at a lower portion of each of the standing parts;
    a support part formed to be bent inwards at an upper portion of the second protruding part;
    a second wing part formed to be bent outwards at a lower portion of the second protruding part; and
    a coupling hole formed in the second wing part.

2. The side bracket for installing a sprinkler according to claim 1, wherein the screw hole formed in the top surface part is positioned in a direction perpendicular to the support part so that clamping force of the pressing member effectively acts on the support part.

* * * * *